(12) United States Patent
Lau

(10) Patent No.: US 8,803,377 B2
(45) Date of Patent: Aug. 12, 2014

(54) POWER TOOL

(71) Applicant: Johnson Electric S.A., Murten (CH)

(72) Inventor: James Ching-Sik Lau, Hong Kong (CN)

(73) Assignee: Johnson Electric S.A., Murten (CH)

(*) Notice: Subject to any disclaimer, the term of this patent is extended or adjusted under 35 U.S.C. 154(b) by 0 days.

(21) Appl. No.: 13/834,587

(22) Filed: Mar. 15, 2013

(65) Prior Publication Data
US 2013/0241325 A1 Sep. 19, 2013

Related U.S. Application Data

(63) Continuation of application No. 12/829,825, filed on Jul. 2, 2010, now Pat. No. 8,415,842.

(30) Foreign Application Priority Data

Jul. 3, 2009 (CN) .......................... 2009 1 0108583

(51) Int. Cl.
H02K 7/14 (2006.01)
H02K 9/00 (2006.01)

(52) U.S. Cl.
USPC .................. 310/50; 310/64; 310/58; 310/59; 310/60 R

(58) Field of Classification Search
USPC ................................ 310/50, 64, 58, 59, 60 R
See application file for complete search history.

(56) References Cited

U.S. PATENT DOCUMENTS

| | | | |
|---|---|---|---|
| 4,322,646 A | 3/1982 | Persson | |
| D325,560 S | 4/1992 | Baines | |
| 5,698,913 A * | 12/1997 | Yagi et al. | 310/58 |
| 5,877,576 A | 3/1999 | CoChimin | |
| 5,925,947 A | 7/1999 | Kajiwara et al. | |
| 6,050,786 A | 4/2000 | Lin | |
| 6,111,235 A | 8/2000 | Ritter et al. | |
| 6,145,585 A | 11/2000 | Wei | |
| 6,455,186 B1 * | 9/2002 | Moores et al. | 429/71 |
| 6,729,414 B2 | 5/2004 | Cooper et al. | |
| 7,157,818 B2 | 1/2007 | Jones | |
| 7,166,939 B2 | 1/2007 | Voigt et al. | |
| 7,323,796 B2 | 1/2008 | Oomori et al. | |
| 8,039,999 B2 | 10/2011 | Chen | |
| 2003/0184172 A1 | 10/2003 | Ghiotto | |
| 2004/0104636 A1 | 6/2004 | Ortt et al. | |
| 2004/0263008 A1 | 12/2004 | Voigt et al. | |

(Continued)

FOREIGN PATENT DOCUMENTS

CN 1945931 4/2007
DE 10 2009 015422 A1 10/2009

(Continued)

Primary Examiner — Tran Nguyen
Assistant Examiner — Alex W Mok
(74) Attorney, Agent, or Firm — Muncy, Geissler, Olds & Lowe, P.C.

(57) ABSTRACT

A power tool has a casing and a motor assembly installed within the casing. The motor assembly comprises a motor, a heat dissipation device, a fan and a guiding member. The motor has a stator and a rotor. The heat dissipation device has an annular heat absorbing section which is fitted to a housing of the stator and a plurality of fins extending from the heat absorbing section for dissipating heat. Air flow generated by the fan is guided to the fins of the heat dissipation device by the guiding member to cool the motor.

11 Claims, 5 Drawing Sheets

(56) References Cited

U.S. PATENT DOCUMENTS

| | | |
|---|---|---|
| 2005/0236917 A1 | 10/2005 | Lui |
| 2005/0269884 A1 | 12/2005 | Teranishi et al. |
| 2006/0012254 A1 | 1/2006 | Einheuser et al. |
| 2006/0013712 A1 | 1/2006 | Lee et al. |
| 2006/0055254 A1* | 3/2006 | Pellegrino ............ 310/58 |
| 2006/0066160 A1 | 3/2006 | Ikuta et al. |
| 2006/0261686 A1 | 11/2006 | Rutsyamuka |
| 2006/0284511 A1 | 12/2006 | Evon et al. |
| 2007/0057588 A1 | 3/2007 | Hyodo et al. |
| 2007/0075595 A1 | 4/2007 | Narayanan et al. |
| 2007/0182269 A1 | 8/2007 | Takahashi et al. |
| 2008/0007916 A1 | 1/2008 | Hogg et al. |
| 2008/0122322 A1 | 5/2008 | Izumi |
| 2008/0231126 A1 | 9/2008 | Telore et al. |
| 2008/0290745 A1 | 11/2008 | Riedl |
| 2008/0309172 A1 | 12/2008 | Tseng |
| 2009/0015079 A1 | 1/2009 | Riedl et al. |
| 2009/0079279 A1 | 3/2009 | Cheng et al. |
| 2009/0096300 A1 | 4/2009 | Oyoung et al. |
| 2009/0121564 A1 | 5/2009 | Pal et al. |
| 2009/0127946 A1 | 5/2009 | Fee et al. |
| 2009/0145621 A1 | 6/2009 | Lau et al. |
| 2009/0200878 A1 | 8/2009 | Walter |

FOREIGN PATENT DOCUMENTS

| | | | |
|---|---|---|---|
| EP | 1222 A | * | 4/1979 |
| EP | 0001222 A1 | | 4/1979 |
| EP | 0697761 A1 | | 2/1996 |
| GB | 2209878 A | | 5/1999 |
| JP | 55150755 A | * | 11/1980 |
| JP | 59061448 A | * | 4/1984 |
| JP | 2001251815 A | * | 9/2001 |
| JP | 2009-137011 A | | 6/2009 |

\* cited by examiner

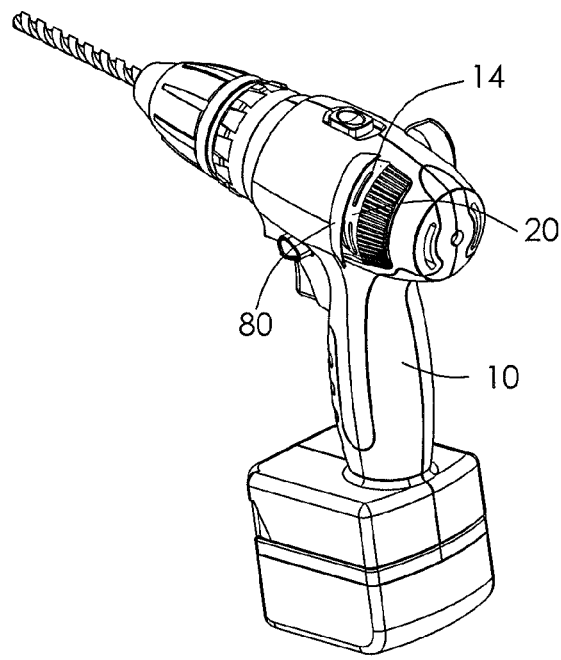
FIG. 9
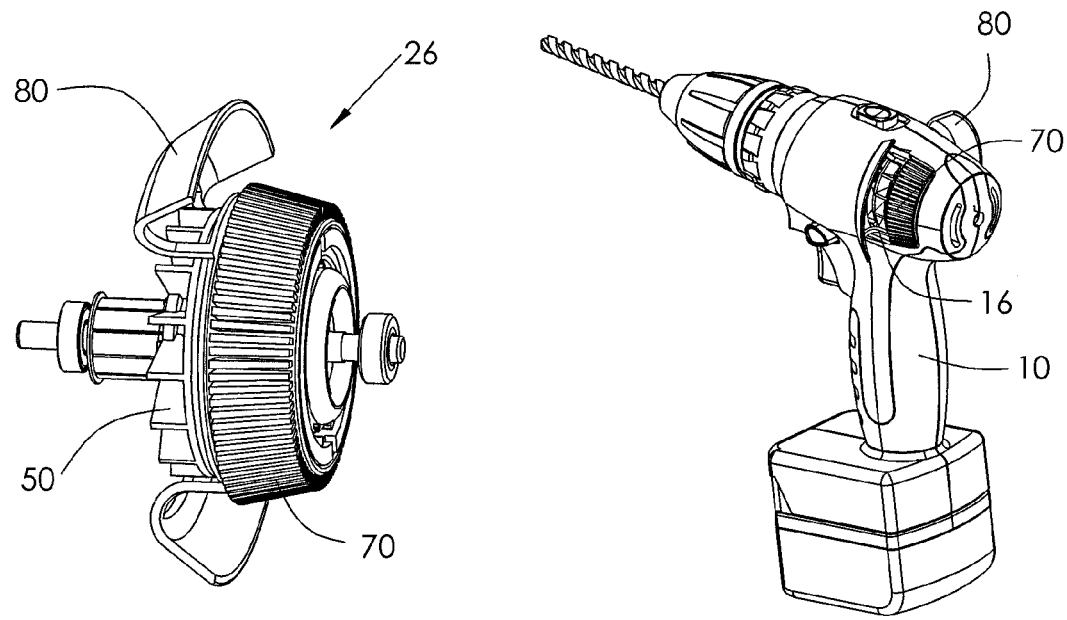
FIG. 10
FIG. 11

POWER TOOL

CROSS REFERENCE TO RELATED APPLICATIONS

This application is a Continuation of co-pending application Ser. No. 12/829,825, filed on Jul. 2, 2010, for which priority is claimed under 35 U.S.C. §120; and this application claims priority of Application No. 200910108583.9 filed in The People's Republic of China on Jul. 3, 2009 under 35 U.S.C. §119, the entire contents of all of which are hereby incorporated by reference.

FIELD OF THE INVENTION

This invention relates to power tools and in particular to a motor assembly for use in a power tool.

BACKGROUND OF THE INVENTION

Power tools such as drills are widely used. A power tool generally comprises a motor and a speed reduction gear box. The motor's output speed is reduced by the gear box, while the motor's output torque is increased. A lot of heat is generated during high load operation of the motor. The performance of the motor will be affected if the heat is not dissipated in time.

SUMMARY OF THE INVENTION

Hence there is a desire for a power tool having a motor with improved cooling.

Accordingly, in one aspect thereof, the present invention provides a power tool comprising: a casing with an inlet and an outlet; and a motor assembly installed within the casing, the motor assembly comprising a motor, a heat dissipation device, a fan and a guiding member, the motor comprising a stator and a rotor having a shaft; the heat dissipation device being arranged on a radially outer surface of the stator for absorbing heat from the stator, wherein air flow generated by the fan enters the casing via the inlet and is guided to the heat dissipation device by the guiding member.

Preferably, the heat dissipation device comprises a heat absorbing section and a plurality of fins extending from the heat absorbing section, the heat absorbing section being disposed around and contacting with the outer surface of the stator.

Optionally, the casing defines an opening exposing the fins of the heat dissipation device to outside of the casing.

Preferably, the air flow generated by the fan flows into the casing through the inlet and through an airflow passage within the stator before being guided to the fins of the heat dissipation device by the guiding member.

Preferably, some of the fins are radially longer than the remaining fins, the radially longer fins contacting an inner surface of the casing to form an air passage between the inner surface of the casing and the heat dissipation device.

Preferably, air flow generated by the fan is guided to the heat dissipation device by the guiding member before exiting the casing through the outlet.

Alternatively, the air flow generated by the fan flows out of the casing through the outlet before being guided to the fins of the heat dissipation device by the guiding member.

Preferably, the guiding member comprises a pair of U-shaped sections, the casing has a pair of outlets and a pair of locking slots at opposite ends of each outlet, the ends of each of the U-shaped sections are engaged in a respective locking slot.

Alternatively, the guiding member comprises a pair of curved sections integrally formed with the heat dissipation device.

Alternatively, the guiding member is integrally formed with the fan.

Preferably, the stator includes a housing and an airflow passage extends between opposite ends of the housing, whereby air flow generated by the fan is guided to the heat dissipation device by the guiding member after passing through the airflow passage.

Preferably, the motor is a DC motor and the stator comprising a housing. Optionally, at least one permanent magnet is fixed to an inner surface of the housing. Alternatively, the stator may have windings wound about salient poles of the stator which are formed or located on an inner surface of the housing.

According to a second aspect, the present invention also provides a motor assembly comprising: a motor comprising a stator and a rotor having a shaft; a heat dissipation device disposed about a radially outer surface of the stator for absorbing heat from the stator, a fan attached to the rotor; and a guiding member configured to guide airflow generated by the fan to the heat dissipation device.

Preferably, the heat dissipation device comprises a heat absorbing section and a plurality of fins extending from the heat absorbing section, the heat absorbing section being disposed around and contacting with a radially outer surface of the stator.

Preferably, the guiding member comprises a pair of curved sections integrally formed with the heat dissipation device.

Alternatively, the guiding member is integrally formed with the fan.

Preferably, the motor is a PMDC, BLDC, BLAC, or universal motor.

Preferably, the stator comprises a housing and at least one permanent magnet fixed to an inner surface of the housing.

A motor assembly as well as a power tool according to preferred embodiments of the present invention comprises a fan, guiding member and a heat dissipation device fitted to the motor. Air flow generated by the fan is guided to the heat dissipation device to achieve an improved cooling effect.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 9 illustrates a power tool according to another embodiment of the present invention;

FIG. 10 illustrates a motor assembly of the power tool shown in FIG. 9;

FIG. 11 illustrates the power tool of FIG. 9 with a part removed;

DETAILED DESCRIPTION OF THE PREFERRED EMBODIMENTS

Figure 1:
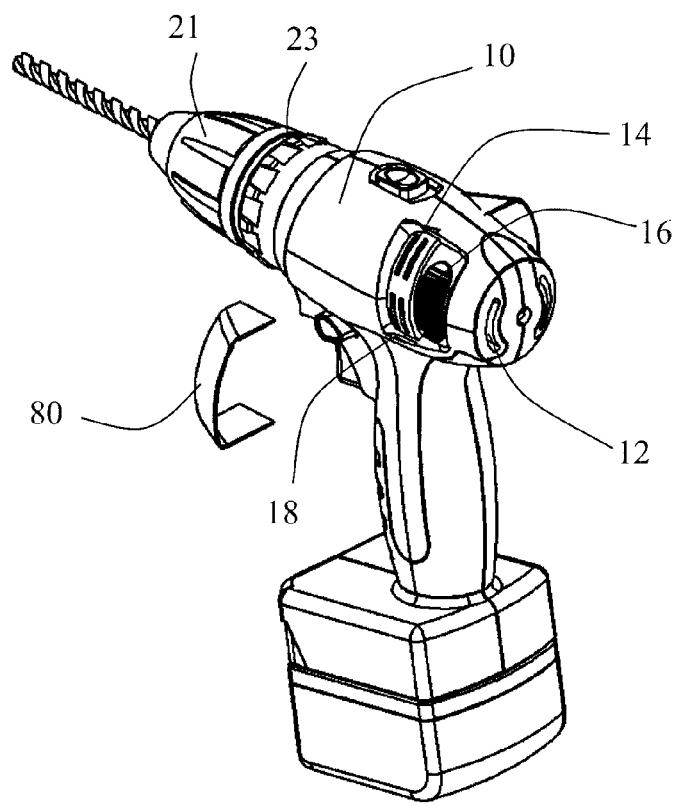
FIG. 1 illustrates a power tool according to the preferred embodiment of the present invention.
Figure 2:
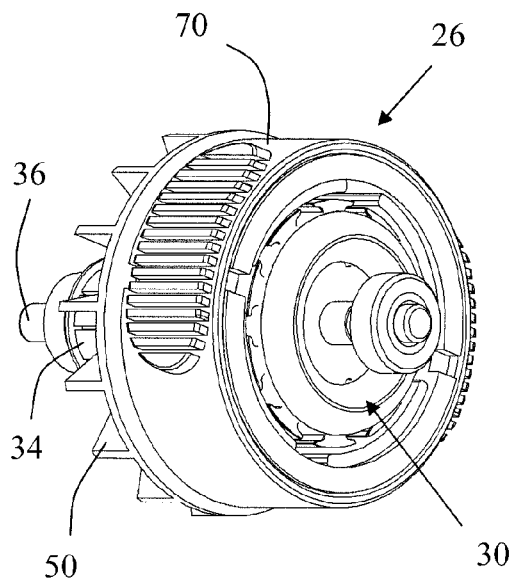
FIG. 2 illustrates a motor assembly of the power tool of FIG. 1.
Figure 3:
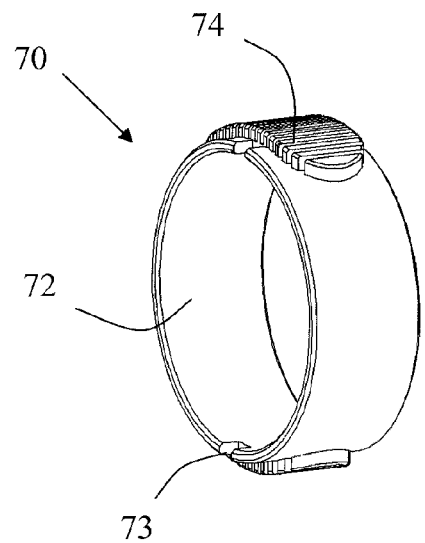
FIG. 3 illustrates a heat dissipation device of the motor assembly shown in FIG. 2.

The preferred embodiment of the present invention will be described with reference to FIGS. 1 to 4. It should be understood that the power tool according to the present invention can be a power drill, power hammer, electric saw, electric wrench, etc. A portable, battery operated, power drill will be used hereafter to describe the invention by way of example only.

A power drill according to the preferred embodiment of the present invention, as shown in FIGS. 1 to 4, comprises a casing 10 and a motor assembly 26 disposed within the casing. The casing 10 defines an inlet 12 and an outlet 14 for the flow of air through the casing to cool the motor. The power tool, being a portable drill, also has a chuck 21 for holding drill bits and a torque control mechanism 23.

The motor assembly 26 comprises a motor 30 and a fan 50 driven by the motor. In this embodiment, the fan 50 is fixed to a rotor of the motor 30. The rotor includes a shaft 36 and a rotor core and a commutator 34 fixed to the shaft. The motor has a housing 32 forming a part of the stator of the motor. A heat dissipation device 70 is disposed about an outer surface of the stator, i.e. fitted to the radially outer surface of the housing 32. The heat dissipation device 70 preferably comprises an annular heat absorbing section 72 and a plurality of fins 74 arranged at the radially outer surface of the heat absorbing section for dissipating heat. The heat absorbing section 72 is fitted to the outer surface of the housing 32. Thermally conductive adhesive may be used to fix the heat absorbing section 72 to the motor housing and to fill any spaces between the housing 32 and the heat absorbing section 72 to improve the heat transfer. Small cutouts 73 are formed at both axial ends of the heat absorbing section 72, and small cutouts 33 are formed at both axial ends of the housing 32 of the motor 30. The small cutouts 73 as well as cutouts 33 engage ribs on the inner surface of the casing 10 of the power drill, so as to limit axial and circumferential movement of the motor 30/heat dissipation device 70.

Figures 4, 5:
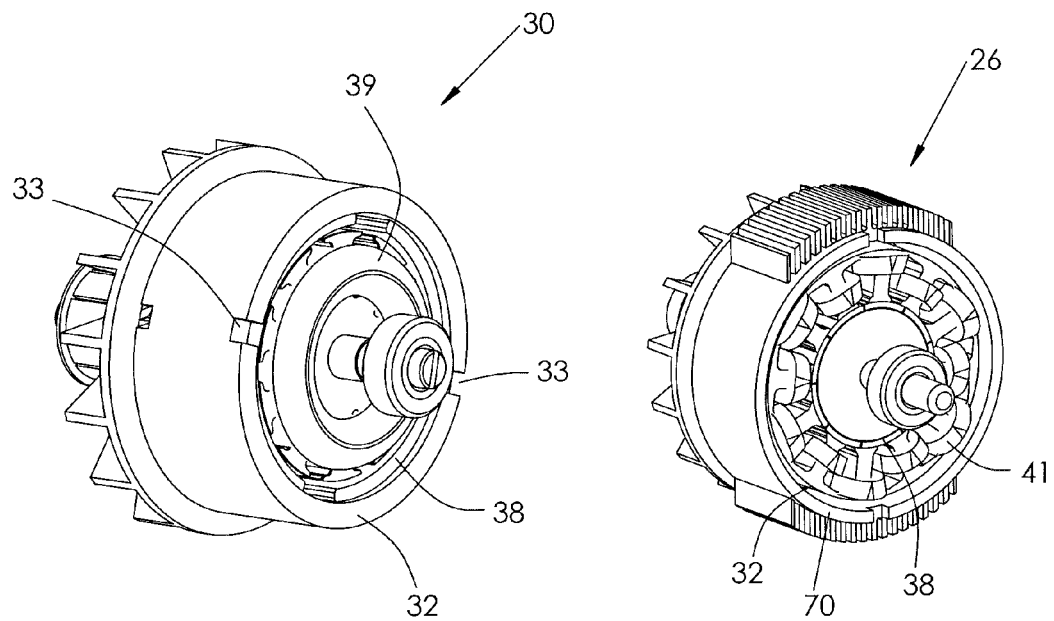
FIG. 4 shows the motor assembly without the heat dissipation device.
FIG. 5 illustrates a motor assembly according to another preferred embodiment of the present invention.
Figure 6:
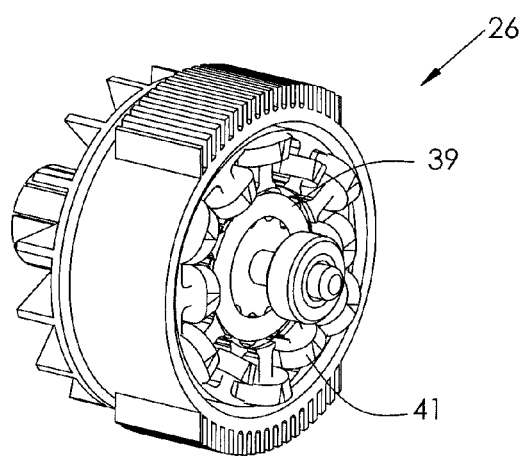
FIG. 6 illustrates a motor assembly according to a further preferred embodiment of the present invention.

Optionally, an airflow passage is provided inside the housing 32. In this embodiment, the airflow passage extends from one axial end of motor to the other. Motor 30 can be a commutator motor such as PMDC motor having, permanent magnets 38 fixed to an inner surface of the housing, rotor windings 39 and a commutator, as shown in FIG. 4. Alternatively, motor 30 may be a brushless motor, with salient poles with stator windings 41 arranged inside the housing 32, and magnets 38 fixed to the rotor, as shown in FIG. 5. Furthermore, motor 30 may be a universal motor, having stator windings 41 wound about salient poles arranged inside the housing 32, and rotor windings 39 wound on the rotor, as shown in FIG. 6.

Preferably, heat dissipation device 70 is made of aluminum. However, it is apparent that heat dissipation device 70 can be made of any other suitable heat conductive material. Fins 74 of heat dissipation device 70 are arranged on a part of outer surface of annular heat absorbing section 72. In FIG. 6, the fins 74 are arranged on two diametrically opposite surface portions of the heat absorbing section 72. Casing 10 of the power drill comprises two openings 16 to expose the fins 74. Further more, the fins 74 may extend outside of the casing through the openings 16. The heat in the housing 32 such as the heat generated by the stator windings is quickly absorbed by the annular heat absorbing section 72, and the heat is dissipated by the fins 74. Heat dissipation surface area of the heat dissipation device 70 is increased by the fins 74.

A guiding member 80, as shown in FIG. 1, is arranged at each outlet 14 of the casing 10. The airflow generated by the fan 50 is guided to the fins 74 by the guiding members, so that cooling is improved.

Preferably, the guiding member 80 comprises a pair of U-shaped sections, and the casing 10 comprises two outlets 14. A pair of locking slots 18 are formed at opposite ends of each outlet 14 for engaging the ends of the U-shape sections which are adapted to mate with and be captured by the locking slots. In FIG. 1 the closer U-shaped section is located spaced from the casing, in a manner ready to be fitted to the casing, to more clearly show the outlet 14 which it will partially cover when assembled.

During operation, airflow generated by fan 50 comes into the casing 10 through the inlet 12, through one axial end of motor 30 into interior space of the motor 30 through the airflow passage, out through the other axial end of the motor and then guided to the fins 74 by the airflow guiding member 80. Thus the airflow engages with the fins to quickly dissipate the heat contained therein. The airflow passage through the motor may be formed by the air gap between the stator and the rotor, the gap between rotor windings, the gap between the magnets, etc.

Figure 7:
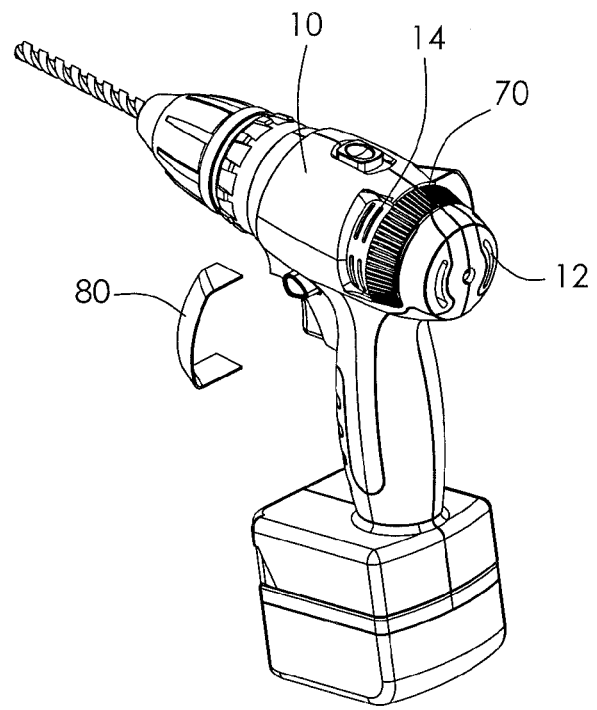
FIG. 7 illustrates a power tool according to another preferred embodiment of the present invention.
Figure 8:
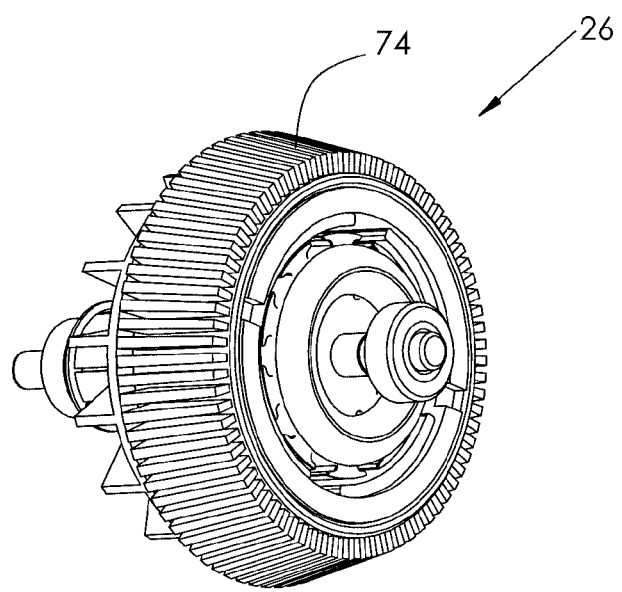
FIG. 8 illustrates a motor assembly according to another embodiment of the present invention.

In an alternative embodiment shown in FIGS. 7 and 8, the fins 74 are arranged on the whole radially outer surface of the heat absorbing section 72. The casing 10 of the power tool has single large slot through which the heat dissipation device 70 extends to expose the fins to the air outside of the casing. The guiding member 80 directs the air coming out of the air outlets 14 in a similar manner as in the first embodiment of FIG. 1.

Referring now to the embodiment of FIGS. 9 to 11, the guiding member 80 is formed by a pair of curved sections integrally formed with the head dissipation device 70. The casing 10 of the power drill comprises two openings 16 through which the pair of curved sections extend. When the motor assembly is installed to the casing, a cap 20 is fitted to each opening 16. Outlets 14 are formed in the caps 20. The flow path of airflow generated by the fan 50 is similar to that describe with reference to the first embodiment. In FIG. 11, the power tool of FIG. 9 is shown with the cap 20 removed to reveal the opening 16 provided to allow the guiding members to pass through the casing during assembly. The caps 20 also provide a safety function by preventing accidental contact with the motor or fan by a user of the power tool.

Figure 12:
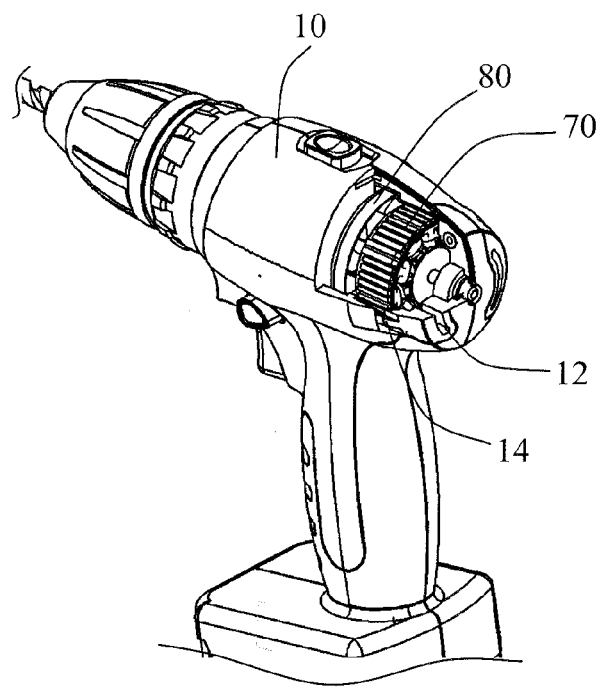
FIG. 12 illustrates a power tool according to a further embodiment of the present invention, wherein a portion of the casing is cut away to expose the motor assembly.
Figure 13:
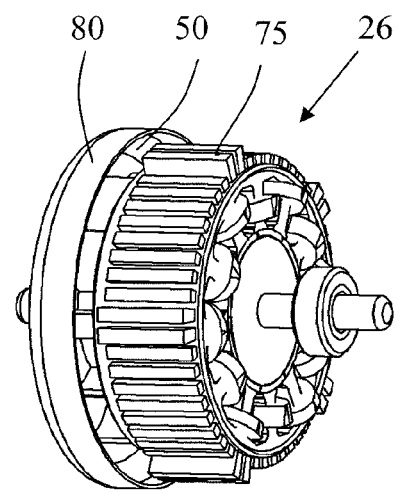
FIG. 13 illustrates the motor assembly of the power tool of FIG. 12.
Figure 14:
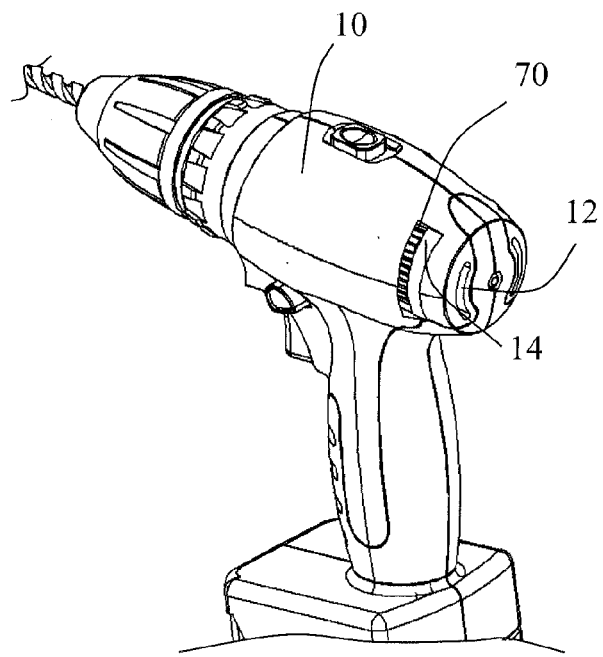
FIG. 14 illustrates the power tool of FIG. 12, with the casing complete.

Referring now to FIGS. 12 to 14, in this embodiment, heat dissipation device 70 is installed inside the casing 10 and in the airflow passage. The airflow generated by the fan comes into the casing from the inlet 12, passes through an airflow passage inside the motor from one axial end of the motor to the other, is guided to the fins 74 of the heat dissipation device 70 by the guiding member 80, and then expelled from the casing 10 through the outlet 14. In this embodiment, the guiding member 80 is hat-shaped and integrally formed with one axial end of the fan 50 and surrounds the fan. Some of the fins 75 have a larger radial dimension than the other fins 74 and contact with an inner surface of the casing 10 so that an air passage is formed between the casing 10 and the motor housing, and the heat dissipation device 70 is disposed in this air passage. FIG. 14 shows the complete power tool whereas in FIG. 12 a portion of the casing 10 has been cut away to reveal the motor assembly with the heat dissipation device 70 located in the air passage within the casing.

It will be understood that the fan can be fixed to the shaft of the motor directly or indirectly. Optionally, the fan is attached to a core of the rotor carried by the shaft. Further more, the fan may be installed independently from the motor 30 and be driven by another driving source. Airflow can be guided to heat dissipation device before or after coming out of the casing from outlet 14. Furthermore, airflow generated by the fan can flow inside the motor and/or outside the motor. In an alternative embodiment, the airflow generated by the fan comes inside the casing 10 by inlet 12, and then flows to the outlet 14 through an airflow passage outside the motor instead of inside the motor. This arrangement is desired for use with a fully sealed motor.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A motor assembly comprising:
a motor comprising a stator, a rotor installed inside the stator, and an airflow passage formed inside the motor, the airflow passage having two axial ends both being open to communicate with outside of the motor;
a heat dissipation device disposed on a radially outer surface of the stator for absorbing heat from the stator,
a fan attached to the rotor and located outside of the motor adjacent to one axial open end of the motor for generating an airflow to pass through the airflow passage inside the motor; and
a guiding member arranged at one end of the motor and configured to guide the airflow generated by the fan to the heat dissipation device on the radially outer surface of the stator,
wherein the airflow generated by the fan enters into the airflow passage inside the motor from outside of the motor via the other one axial open end of the motor away from the fan and exits the airflow passage via the one axial open end of the motor adjacent the fan, the airflow reaches the fan located outside of the motor after exiting the airflow passage inside the motor and is then guided to the heat dissipation device by the guiding member.

2. The motor assembly of claim 1, wherein the heat dissipation device comprises a heat absorbing section and a plurality of fins extending from the heat absorbing section, the heat absorbing section being disposed around and contacting with the radially outer surface of the stator.

3. The motor assembly of claim 1, wherein the guiding member comprises a pair of curved sections integrally formed with the heat dissipation device.

4. The motor assembly of claim 1, wherein the guiding member is integrally formed with the fan.

5. The motor assembly of claim 1, wherein the stator comprises a housing and at least one permanent magnet fixed to an inner surface of the housing.

6. A power tool comprising:
a casing with an inlet and an outlet; and
a motor assembly installed within the casing, the motor assembly comprising a motor with a ring, a heat dissipation device, and a fan, an air passage being formed between the casing and the ring,
the motor comprising a stator and a rotor having a shaft;
the heat dissipation device being arranged on a radially outer surface of the ring for absorbing heat from the motor, the heat dissipation device being disposed at the air passage,
the fan being attached on the shaft of the rotor,
wherein air flow generated by the fan enters the casing via the inlet and then flows to the outlet through the air passage and heat dissipation device to thereby cool the motor, and
wherein the inlet is defined at an axial end of the casing adjacent to one axial end of the motor, and the outlet is defined at a portion of the casing adjacent to the other axial end of the motor.

7. The power tool of claim 6, wherein the air flow exits the outlet in a direction parallel to an axial direction of the casing.

8. The power tool of claim 6, wherein the heat dissipation device comprises a plurality of fins which extend in a direction parallel to an axial direction of the casing, some of the fins having a larger radial dimension than the other fins and contacting with an inner surface of the casing.

9. The power tool of claim 6, wherein the motor has two axial ends, both are open to communicate with outside the motor and the air flow passes through inside the motor before flowing through the air passage and heat dissipation device.

10. The power tool of claim 9, further comprising a guiding member arranged at one end of the motor and configured to guide the airflow passing through inside the motor to the air passage and heat dissipation device.

11. The power tool of claim 6, wherein the fan is located outside of the motor.

* * * * *